(12) United States Patent
Ramachandran et al.

(10) Patent No.: US 8,213,959 B2
(45) Date of Patent: Jul. 3, 2012

(54) METHOD FOR UPDATING LOCATION OF USER EQUIPMENT

(75) Inventors: Vinod Kumar Ramachandran, Chennai (IN); Richa Dham, Bangalore (IN); Suresh Kalyanasundaram, Bangalore (IN)

(73) Assignee: Motorola Mobility, Inc., Libertyville, IL (US)

( * ) Notice: Subject to any disclaimer, the term of this patent is extended or adjusted under 35 U.S.C. 154(b) by 213 days.

(21) Appl. No.: 12/679,381

(22) PCT Filed: Oct. 14, 2008

(86) PCT No.: PCT/US2008/079831
§ 371 (c)(1),
(2), (4) Date: Mar. 22, 2010

(87) PCT Pub. No.: WO2009/058555
PCT Pub. Date: May 7, 2009

(65) Prior Publication Data
US 2010/0222074 A1 Sep. 2, 2010

(30) Foreign Application Priority Data
Nov. 2, 2007 (IN) .......................... 2292/DEL/2007

(51) Int. Cl.
*H04W 24/00* (2009.01)
(52) U.S. Cl. ............... 455/456.1; 455/456.2; 455/456.6; 455/457; 455/414.2; 370/312

(58) Field of Classification Search ............... 455/456.1, 455/456.6, 414.2, 456.2, 457
See application file for complete search history.

(56) References Cited

U.S. PATENT DOCUMENTS

| | | | |
|---|---|---|---|
| 7,979,081 B1 * | 7/2011 | Sharobim | 455/458 |
| 8,125,937 B2 * | 2/2012 | Akhtar et al. | 370/312 |
| 2007/0249329 A1 * | 10/2007 | Zou | 455/414.2 |
| 2008/0207227 A1 * | 8/2008 | Ren et al. | 455/458 |
| 2009/0129307 A1 * | 5/2009 | Akhtar et al. | 370/312 |

OTHER PUBLICATIONS

Agrawal, Rajeev et al.: "Directional Distance-based Location Update Mechanism Using Knowledge of Mobility Patterns", published at the 3rd Motorola China Technology Symposium, May 2006, all pages.
3GPP2 C.S0024-B, Version 2, cdma2000 high rate packet data air interface specification, Mar. 2007, Sections 7.8.1, 7.8.6.1.5.4, 7.8.6.2.1.

* cited by examiner

*Primary Examiner* — David Q Nguyen

(57) ABSTRACT

A method for updating location of a user equipment in a cellular system is disclosed. The method comprises the user equipment receiving route update radius information 220. The user equipment further calculates a route update radius from the received route update radius information 230 by using a random number generated by the user equipment. The user equipment then transmits the calculated route update radius to a cellular network 240. Alternatively, the method comprises the cellular network receiving a route update message from a user equipment 420. The cellular network further calculates a route update radius 430 using a random number generated by the cellular network. The cellular network then unicasts the calculated route update radius to the user equipment 440.

11 Claims, 4 Drawing Sheets

METHOD FOR UPDATING LOCATION OF USER EQUIPMENT

FIELD OF THE DISCLOSURE

The present disclosure relates generally to user equipment, and more particularly, to a method for updating location of a user equipment.

BACKGROUND

In a cellular system, a cellular network generally tracks the location of a user equipment so that when an incoming call arrives, the cellular network is able to terminate the incoming call for the user equipment. When the user equipment moves from one routing area to another routing area of the cellular network, the user equipment sends a message to the cellular network to update the user equipment's location. This message is known as a route update message.

One popular technique to update a user equipment's location is distance based location update. In distance based location update, each cell of the cellular network broadcasts its latitude, longitude, and a parameter called a route update radius. In existing cellular networks, the route update radius is the same for all the user equipments in a particular cell. Each user equipment uses the broadcasted route update radius to calculate its routing area.

As a user equipment moves out of a routing area, it sends a route update message to the cellular network for updating its location. Upon receiving the route update message, the cellular network computes a new routing area for the user equipment. Having knowledge of the user equipment's routing area, the cellular network is able to alert the user equipment when there is an incoming communication for the user equipment.

When a number of user equipments are in one location, e.g. an arriving terminal of an airport, all of the user equipments in the location generally send route update messages at the same time. For example, after landing, many passengers switch on their user equipment at the same time and move together from immigration to baggage claim at the same time. Using distance based location update, because all the user equipments in the location send a route update message at the same time to the same cells of the cellular network, there is a burst of route update messages. A burst of route update messages places a burden on the cells of the cellular network and may also lead to additional traffic.

Accordingly, there is a need for a new method for updating location of the user equipment.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
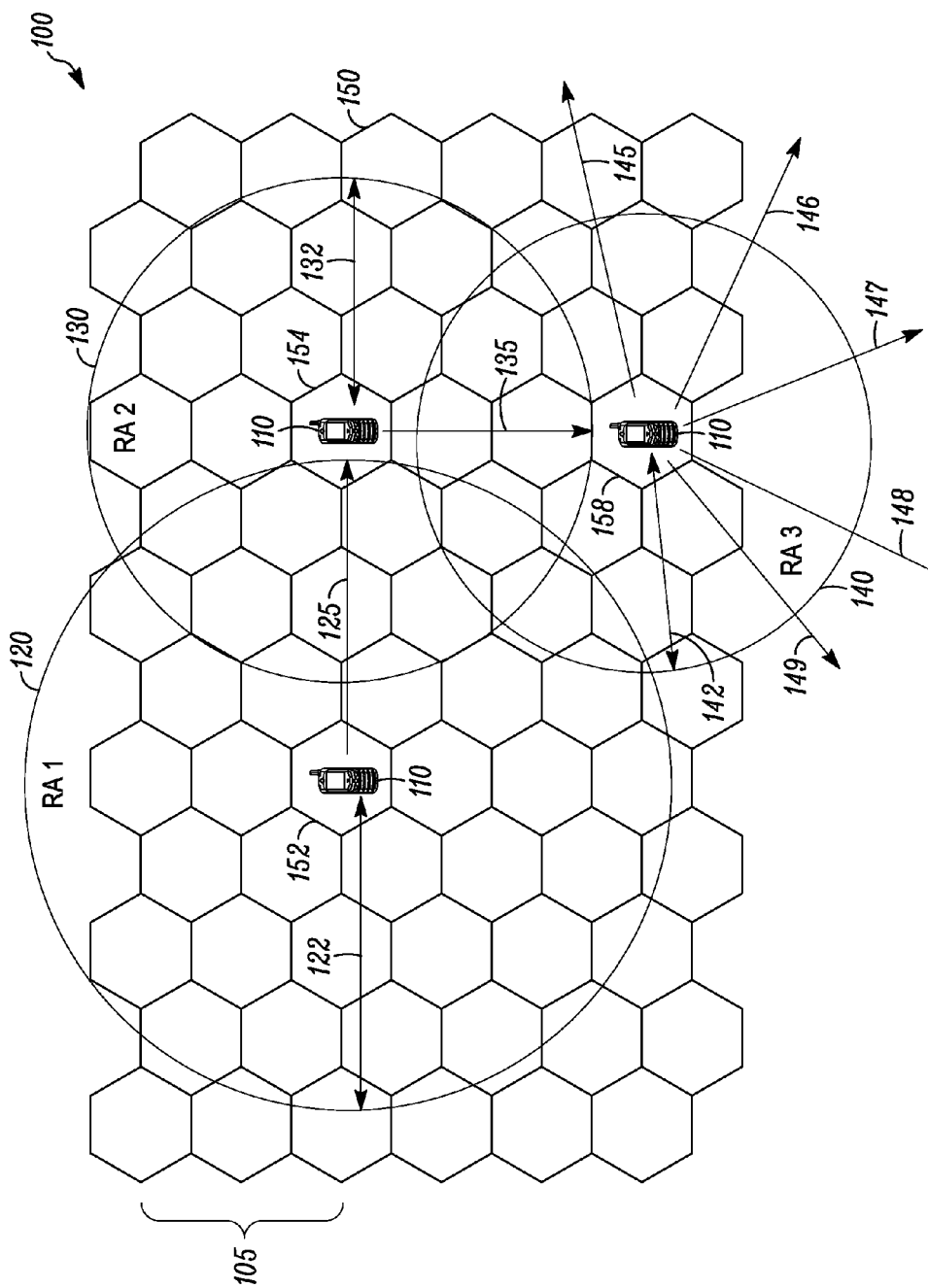
FIG. 1 is a system diagram illustrating a user equipment moving from one routing area to another routing area in a cellular system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments of the present invention provide a method for updating location of user equipment in a cellular system. A method comprising receiving route update radius information by the user equipment, calculating a route update radius from the received route update radius information by using a random number generated by the user equipment, and transmitting the route update radius by the user equipment to a cellular network.

FIG. 1 is a system diagram of a cellular system 100 that comprises user equipment 110 and a cellular network 105. The illustrated cellular network 105 comprises cells that define routing areas 120, 130, 140. FIG. 1 illustrates user equipment 110 moving from one routing area, e.g. 120, to another routing area, e.g. 130, in the cellular system 100. In general terms, a routing area is an area defined by a plurality of cells of the cellular network. As a user equipment moves in the cellular system 100, the user equipment informs the cellular network 105 of its location. In one example, informing the cellular network 105 of location is done by a route update message. The cell in which the user equipment last made an update of its location is called the center cell. Knowing the center cell and a distance called a route update radius, the routing area is defined as the plurality of cells encompassed by the distance of the route update radius from the center cell. A user equipment's location is known to the cellular network 105 at the granularity of a routing area. In FIG. 1, the routing area RA1 120 is defined by the plurality of cells that are at a distance of route update radius 122 from the center cell 152. Therefore, the plurality of cells in RA1 120 defines the routing area RA1.

When a user equipment leaves the area defined by the routing area, it sends a route update message to the cellular network, so that the cellular network knows about the new location of the user equipment. As a user equipment moves from one cell to another, the user equipment computes a distance between a location of the current cell and the center cell. If this distance is greater than the route update radius broadcasted in the cell in which it last sent a route update message, the user equipment sends another route update message to the cellular network. In one example, computing a distance is performed by using latitude and longitude information broadcast by the cells of the cellular network. In another example, in addition to the cells of the cellular network broadcasting latitude and longitude information, the cells of the cellular network also broadcast the route update radius.

For example, in FIG. 1, when user equipment 110 moves from RA1 towards RA2 in the direction 125, the user equipment 110 leaves one cell and enters a new cell. As mentioned when the user equipment 110 enters a new cell, the new cell broadcasts its latitude and longitude to the user equipment 110. The user equipment computes a distance between a location of the new cell (by using the latitude and longitude broadcasted by the new cell) and the cell in which the user equipment last sent a route update message (for example, cell 152 of RA1 in this case). If this distance is greater than the route update radius 122, the user equipment 110 sends a route update message to the cellular network 105.

For example, when the user equipment 110 enters cell 154, the cell 154 broadcasts its latitude and longitude to the user equipment 110. The user equipment 110 computes the distance between the location of the cell 154 and the cell 152. Since the distance is greater than the route update radius 122, the user equipment 110 determines that it has moved out of RA1 120 and sends a route update message to the cellular network 105.

In one example, the cellular system 100 is a CDMA system. Alternatively, the cellular system 100 may be a Global System for Mobile communications (GSM) system. In any case, the cellular system 100 may be any wireless communication system in which the cellular network 105 is divided into a plurality of cells 150. In one example, the cells of the cellular network 105 are capable of calculating a route update radius to transmit to the user equipment 110. In another example, the user equipment 110 is capable of calculating a route update radius to transmit to the cellular network 105 so that the cellular network 105 may calculate a routing area.

As is known, the user equipment 110 may be any type of wireless device equipped for interfacing with the cellular network 105. Examples of the user equipment 110 include an in-car or a handheld mobile, a radio telephone, and a push-to-talk phone. In one example, the user equipment 110 is also capable of calculating a route update radius. In such an example, the user equipment is capable of transmitting the route update radius, e.g. conveyed in a route update message. In another example, the user equipment 110 is capable of receiving a route update radius calculated by the cellular network 105 so that the user equipment 110 can determine its routing area.

Figure 2:
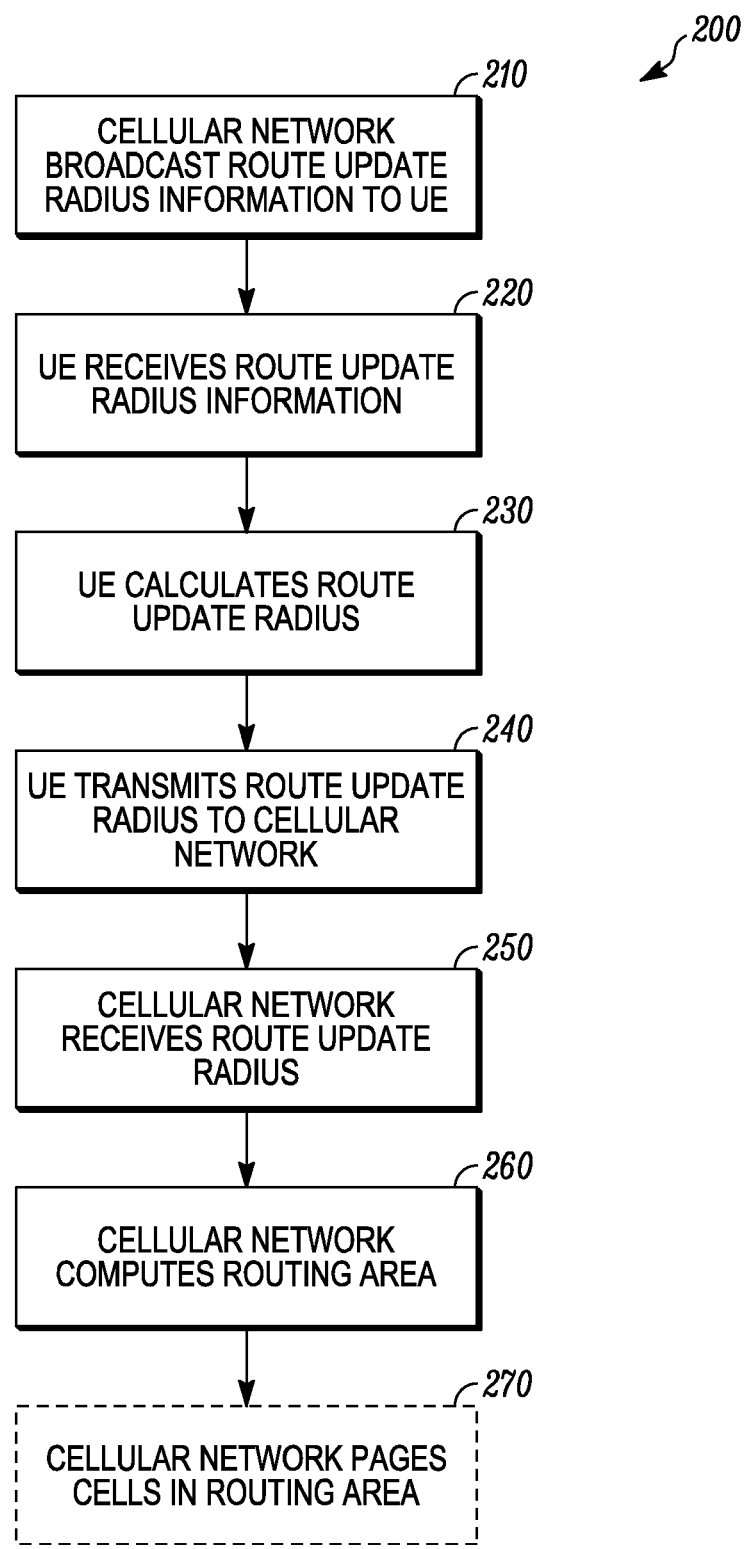
FIG. 2 is a flowchart illustrating a method of updating location of the user equipment in accordance with some embodiments.

FIG. 2 is a flowchart illustrating a method of updating location of the user equipment. In this example, the user equipment, e.g. 110, performs the function of calculating the route update radius. The method 200 starts in step 210 with the cellular network, e.g. 105, broadcasting route update radius information to the user equipment. As used herein, the route update radius information is information that is used by the user equipment to calculate the route update radius so that the user equipment can define its routing area. As used herein, broadcasting refers to sending a message to multiple user equipment.

Broadcasting of the route update radius information, e.g. by the cellular network 105, occurs at regular intervals and is required for the user equipment to send route update messages. The route update messages are generally sent during various events. One such event is when the user equipment is turned ON. Another such event is when the user equipment enters a new routing area. Yet another such event is when a periodic timer at the user equipment expires. In any case, the route update radius information may be broadcast along with system information (e.g. broadcast on a control channel of the cellular system) of the cells of the cellular network. In general, system information is sent by the cellular network to convey information relating to cell descriptions, location area identity, neighboring cell description or relation, physical cell parameters, cell traffic load, traffic measurement information and/or cellular network information.

Regardless of how broadcasting of the route update radius information occurs, the broadcasted route update radius information is information that is used by the user equipment to calculate the route update radius. As such, the route update radius information comprises at least one of a maximum route update radius (Rmax), a lower unit of scaling (p), or a minimum route update radius (Rmin). In one example, Rmax refers to the largest possible route update radius for a routing area. Similarly, Rmin refers to the smallest possible route update radius for a routing area. As is known, either Rmax or Rmin may be defined by an operator of the cellular network. In one example, the broadcasted route update radius information comprises of Rmax and a lower unit of scaling denoted by p. In another example, the broadcasted route update radius information comprises of Rmin and a maximum route update radius (Rmax). In yet another example, the broadcasted route update radius information comprises of a set of possible route update radii (R1, R2, R3, . . . , Rn). In one example, the set of possible route update radii (R1, R2, R3, . . . , Rn) refers to a number of possible route update radii for routing areas in the cellular network. As with Rmax and Rmin, (R1, R2, R3, . . . , Rn) may be defined by an operator of the cellular network.

In step 220, the user equipment receives the route update radius information broadcasted in step 210. In step 230, the user equipment calculates the route update radius using the route update radius information received from the cellular network. The route update radius may be calculated in a number of ways by the user equipment.

If the user equipment receives Rmax and p, the user equipment generates a random number (r) in an interval between p and 1 to calculate the route update radius by multiplying the generated random number with Rmax. Mathematically, in such an example, the route update radius=Rmax*r. As is known, the lower unit of scaling (p) is decided by the cellular network to control a minimum routing area for the user equipment. For example, a high p means a larger route update radius, a larger routing area, and a fewer number of route update messages and a low p means a smaller route update radius, a smaller routing area, and a larger number of route update messages. Accordingly, the cellular network by sending Rmax and p to a plurality of user equipments, the cellular network allows the plurality of user equipments to generate their respective random numbers from within the interval between p and 1 and calculate their respective route update radius. Therefore, each user equipment from the plurality of user equipments may choose different random number, calculating different route update radius, and defining different routing areas for itself. Thus, the cellular network by sending Rmax and p to the plurality of user equipments, and the plurality of user equipments by choosing different random numbers are able to affect the frequency of route update messages from the user equipments.

In another example, if the user equipment receives Rmax and Rmin, the user equipment generates a random number (r) in the interval between Rmin and Rmax to calculate the route update radius. The user equipment calculates the route update radius by setting the route update radius equal to the generated random number (r). Mathematically, in such an example, the route update radius=r. Accordingly, by sending Rmax and Rmin to a plurality of user equipments, the cellular network allows the plurality of user equipments to choose their respective route update radius within a range from Rmin to Rmax. Therefore, each user equipment from the plurality of user equipments may choose different route update radius defining different routing areas for itself Thus, the cellular network sends Rmax and Rmin to the plurality of user equipments and each of the plurality of user equipments chooses different route update radius thereby affecting the frequency of route update messages from the user equipment.

In yet another example, if the user equipment receives a set of possible route update radii (R1, R2, R3, ..., Rn), the user equipment generates a random number to be able to select one of the route update radii in the set. In this example, the generated random number (denoted by the variable r) is an integer that lies in the interval between 1 and n. The user equipment calculates the route update radius by setting the route update radius equal to the route update radius at position r from within the set of possible route update radii (R1, R2, R3 ..., Rn). Mathematically, in such an example, the route update radius=Rr. Accordingly, the cellular network by sending a set of possible route update radii to a plurality of user equipments, the cellular network allows the plurality of user equipments to choose their respective route update radius from within a set of possible route update radii. Therefore, each user equipment from the plurality of user equipments may choose different route update radius defining different routing areas for itself. Thus, the cellular network by sending a set of possible route update radii to the plurality of user equipments, and each of the plurality of user equipments by choosing different route update radius are able to affect the frequency of route update messages from the user equipment.

Regardless of how the user equipment calculates the route update radius, the user equipment generates a random number (r) to calculate a route update radius. Thus, in each of the above examples, a random number (r) was generated in order for the user equipment to calculate the route update radius. In a scenario, when a plurality of user equipments in a same cell receive route update radius information from the cellular network, each user equipment from the plurality of user equipments may generate different random numbers to calculate different route update radii defining different routing areas.

To generate the random number (r), a number of known techniques may be used. In one example, the user equipment generates the random number by using a random number generator. The random number generator may use one of a known probability distribution function to generate the random number. Both discrete as well as continuous probability distribution functions may be used for this purpose. In one example, the random number generator may be programmed to generate a random floating point number using a uniform distribution function with distribution between 0 and 1. An inverse cumulative distribution function of a desired probability distribution function may be applied on the generated random floating point numbers to generate the random number with the desired probability distribution function. In any case, in this example, the random number is generated by the user equipment and used by the user equipment to calculate the route update radius.

An example of a user equipment calculating the route update radius is as follows. If the route update radius information transmitted by the cellular network comprises Rmin (having a value of 1.2) and Rmax (having a value of 5.5), the user equipment uses this route update radius information to calculate a route update radius. If the user equipment uses a random number generator having a uniform distribution between 0 and 1 to generate a random floating point number (having a value of 0.4), then calculation of the route update radius is as follows. The generated random floating point number (0.4) is multiplied by the difference between Rmax and Rmin (5.5-1.2). This value (1.72) is added to Rmin (1.2) to generate the route update radius. This value (2.92) is the new route update radius that the user equipment transmits to the cellular network.

In such an example, a specific probability distribution (e.g. uniform) has been used to generate the random number. As is known, other types of probability distributions may be used and the mention of uniform distribution is not limiting on an embodiment of the present invention. As is further known, any other method for generating a random number can also be used.

After calculating the route update radius, the user equipment transmits the calculated route update radius to the cellular network in step 240. In one example, the user equipment may convey the route update radius to the cellular network in a route update message. The cellular network receives the calculated route update radius in step 250 from the user equipment. Using the received route update radius, the cellular network computes the routing area in step 260 and stores it for future use. One example of where the cellular network uses the routing area is for paging user equipment. When there is an incoming communication for the user equipment, the cellular network pages cells in the computed routing area in step 270 for identifying the particular cell where the user equipment currently is located. When the user equipment is paged, a user of the user equipment may receive the incoming communication. As known, paging refers to sending an alert to the user equipment, so that a user of the user equipment is notified of the incoming communication.

With reference to FIG. 1, the operation of updating location of a user equipment may be described. While in RA1 120 the user equipment 110 receives the route update radius information being broadcast by cell 152 of the cellular network 105, e.g. when the user equipment is switched ON in cell 152. The user equipment 110 receives the route update radius information and generates a first random number. Using the first random number, the user equipment 110 calculates (e.g. by using one of the above described examples) a first route update radius 122. The user equipment 110 then transmits the first route update radius 122 to the cellular network 105, e.g. as part of the route update message. The cellular network 105 receives the first route update radius from the user equipment 110 and computes the routing area RA1 120.

When the user equipment 110 moves in the direction 125 through the cellular network 105, leaves RA1 120, and enters cell 154, it receives the route update radius information being broadcast by the new cell 154. The user equipment 110 receives the route update radius information and generates a second random number. Using the second random number the user equipment 110, calculates (e.g. by using one of the above described examples) a second route update radius 132. The user equipment 110 then transmits the second route update radius 132 to the cellular network 105. The cellular network 105 receives the second route update radius 132 from the user equipment 110 and computes routing area RA2 130.

When the user equipment 110 moves in the direction 135 through the cellular network 105, leaves RA2 130, and enters cell 158, it receives the route update radius information being broadcast by the new cell 158. The user equipment 110 receives the route update radius information and generates a third random number. Using the third random number, the user equipment 110 calculates a third route update radius 142. The user equipment 110 then transmits the third route update radius 142 to the cellular network 105. The cellular network 105 receives the third route update radius from the user equipment 110 and computes routing area RA3 140.

Again, the user equipment 110 may move in any of the directions 145, 146, 147, 148, 149 or in any other direction. When the user equipment 110 leaves a routing area, the same method is repeated. Because the first, second, and third random numbers are different, the first, second, and third route update radii are also different so that the routing areas RA1 120, RA2 130, RA3 140 are also different. As is shown, the same user equipment may have different route update radii at different times.

Figure 3:
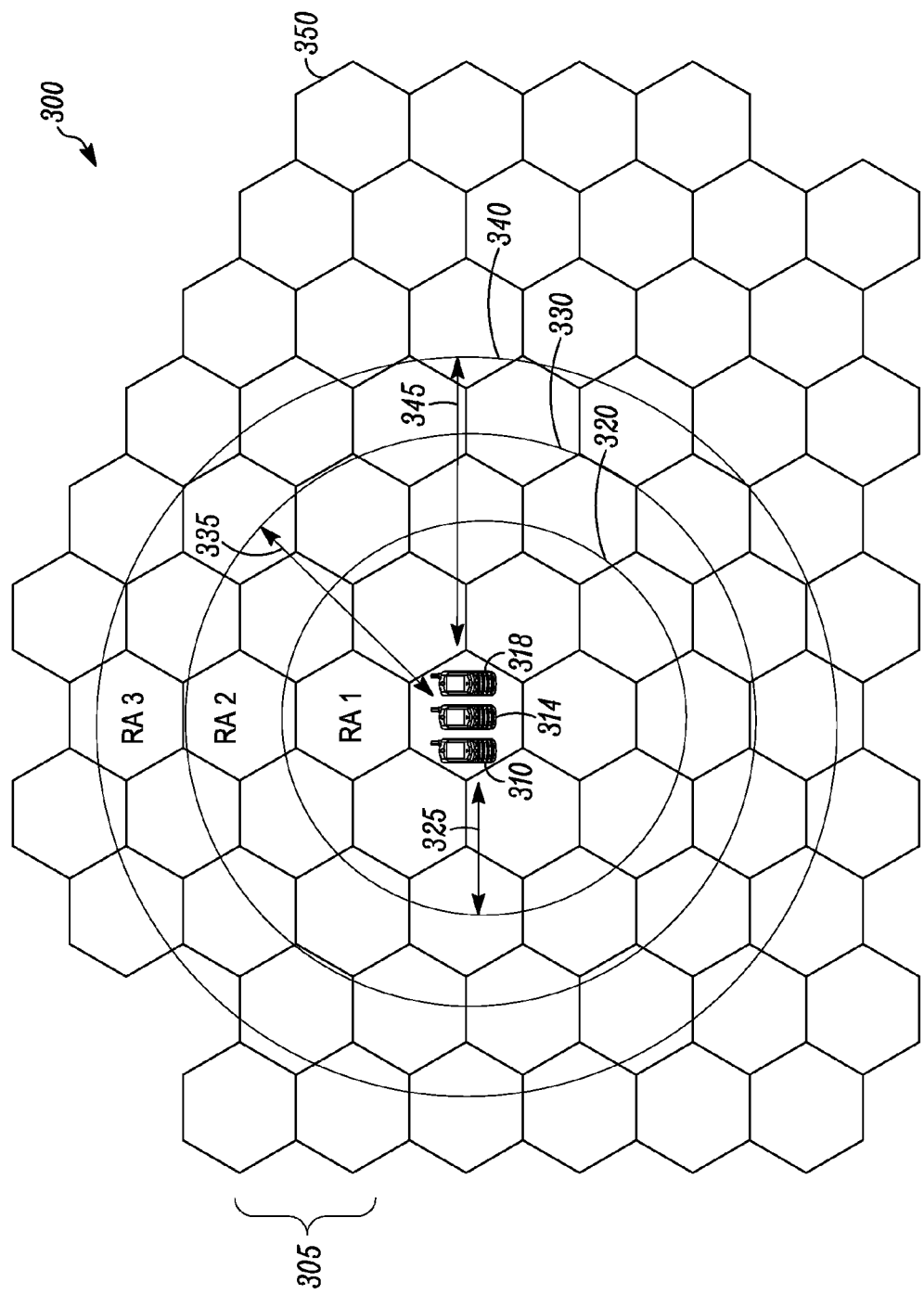
FIG. 3 is a system diagram illustrating a plurality of user equipments having different route update radii in accordance with some embodiments.

FIG. 3 is a system diagram illustrating a plurality of user equipments having different route update radii. As described with reference to FIG. 1, the illustrated cellular network 305 comprises cells that define routing areas 320, 330, 340. FIG. 3 illustrates user equipment 310, 314, 318 having different routing areas 320, 330, 340 respectively, in the cellular system 300. The cellular system 300 may be any wireless communication system in which the cellular network 305 is divided into a plurality of cells 350. The cellular system 300 also includes a plurality of user equipments 310, 314, 318. In one example, the cellular network 305 is capable of calculating a route update radius to transmit to user equipment 310, 314, 318 so that user equipment may calculate respective routing areas.

In FIG. 3, three routing areas RA1 320, RA2 330, RA3 340 are shown. For example, in FIG. 3, the user equipment 310 has a route update radius 325 and a routing area RA1 320. The user equipment 314 has a route update radius 335 and a routing area RA2 330. The user equipment 318 has a route update radius 345 and a routing area 340. As described above, there are a number of events that trigger user equipment to send route update messages to the cellular network, e.g. when user equipment 310, 314, and 318 are switched ON or move out from respective routing areas.

For instance, if user equipment 310, 314, 318 are switched ON at the same time and at the same physical location. The cellular network 305 broadcasts the route update radius information. This broadcasted route update radius information is received by user equipment 310, 314, 318. User equipment 310, 314, 318 receive the route update radius information and each generates a random number. In one example, the random numbers generated vary, e.g. are different. Using the generated random numbers user equipment 310, 314, 318 calculate route update radii 325, 335, 345 respectively. When the generated random numbers are different, the route update radii 325, 335, 345 calculated by the user equipment are different. After calculating the route update radii, the user equipment 310, 314, 318 transmit the calculated route update radii 325, 335, 345 to the cellular network 305. The cellular network 305 receives the route update radii 325, 335, 345 from user equipment 310, 314, 318 and computes routing areas RA1 320, RA2 330, RA3 340.

As a result, each of the user equipment 310, 314, 318 has a different routing area 320, 330, 340. Each of the user equipment 310, 314, 318 sends a route update message when it leaves its routing area. For example, the user equipment 310 sends a route update message to the cellular network 305, when it leaves RA1 320. The user equipment 314 sends a route update message to the cellular network 305, when it leaves RA2 330. The user equipment 318 sends a route update message to the cellular network 305, when it leaves RA3 340. Having different routing areas for the user equipment 310, 314, 318 may prevent a burst of route update messages being sent in the cellular network, even if the user equipment 310, 314, 310 are moving in the same direction and/or at the same speed at the same time, e.g. as in an airport from immigration to baggage claim.

For example, if each of the user equipment is moving at the same speed, then user equipment 310 sends a route update message to the cellular network 305 before the user equipment 314 needs to send a route update message to the cellular network 305. In addition, having different routing areas for the user equipment 310, 314, 318 may prevent a burst of route update messages in the same cells of the cellular network, e.g. as different user equipment leave their respective routing areas at different cells. For example, user equipment 310 will send a route update message to the cells just outside RA1 320 and user equipment 314 will send a route update message to the cells just outside RA2.

Figure 4:
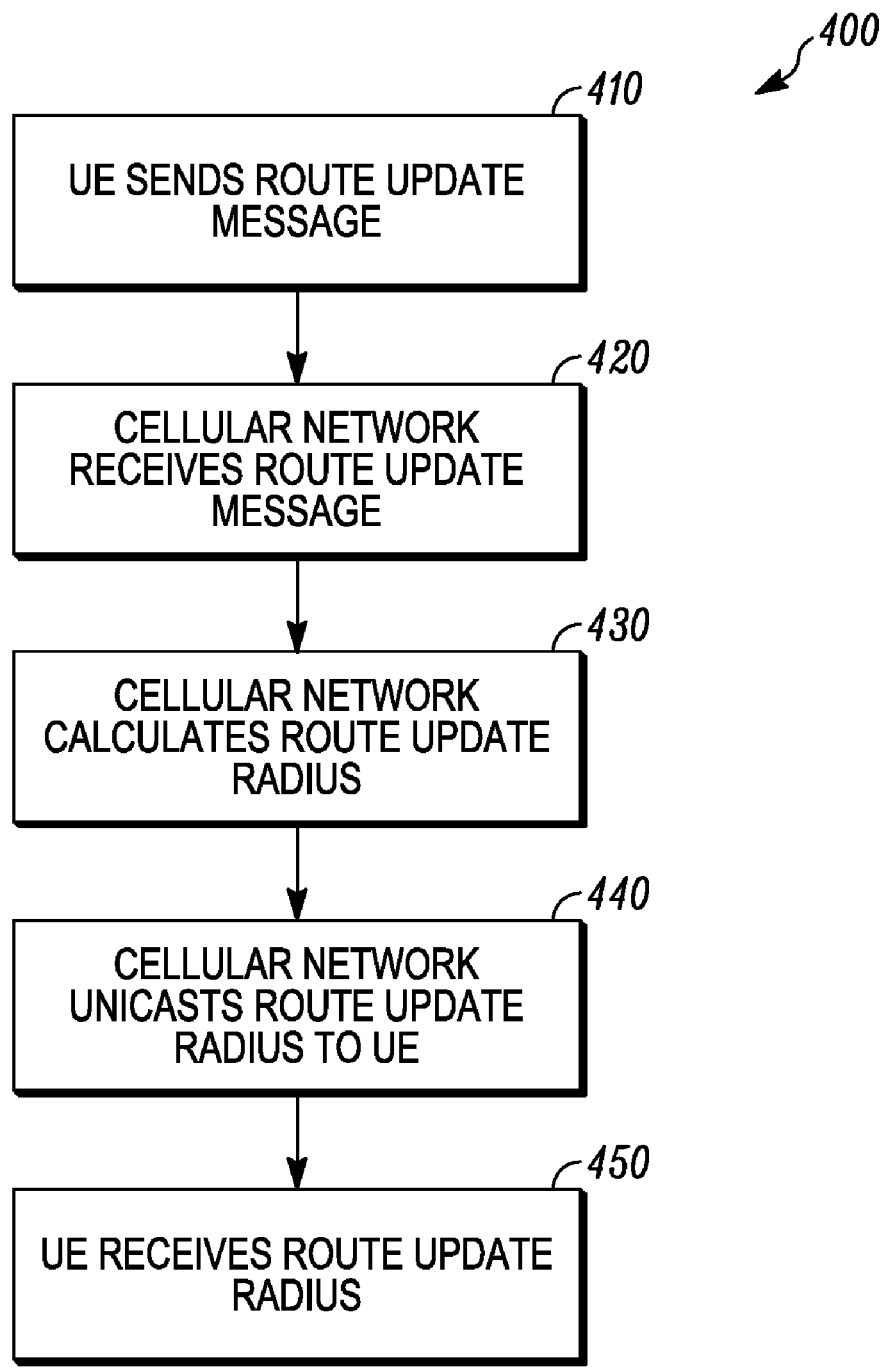
FIG. 4 is a flowchart illustrating another method of updating location of the user equipment in accordance with some embodiments.

FIG. 4 is a flowchart illustrating another method of updating location of the user equipment. In such an example, the cellular network, e.g. 305, performs the responsibility of calculating the route update radius. The method 400 starts in step 410 with the user equipment, e.g. 310, sending a route update message to the cellular network. As mentioned above, there are a number of events that trigger the user equipment to send a route update message to the cellular network, e.g. when the user equipment leaves a routing area or when the user equipment is switched ON.

In step 420, the cellular network receives the route update message. Upon receiving the route update message in step 420, the cellular network calculates the route update radius in step 430 for the user equipment using a random number generated by the cellular network.

The cellular network may calculate the route update radius in a number of ways. Such calculations are similar to how the user equipment may calculate the route update radius as described earlier. In one example, the cellular network generates the random number (r) in an interval between the lower unit of scaling (p) and 1. The cellular network calculates the route update radius by multiplying the generated random number (r) with the maximum route update radius (Rmax). Mathematically, in such an example, the route update radius=Rmax*r.

In another example, the cellular network generates the random number (r) in the interval between the minimum route update radius (Rmin) and the maximum route update radius (Rmax). The cellular network calculates the route update radius by setting the route update radius equal to the generated random number. Mathematically, in such an example, the route update radius=r. By randomly assigning the route update radius to be a value between the smallest and largest possible route update radii for a routing area for each user equipment, the cellular network is able to define different routing areas for each user equipment. Thus, the cellular network is able to affect the frequency of route update messages from user equipment.

In yet another example, the cellular network has a set of possible route update radii (R1, R2, R3, ..., Rn). The cellular network generates a random number to be able to select one of the route update radii in the set. In this example, the generated random number (denoted by the variable r) is an integer that lies in the interval between 1 and n. The generated random number is an integer and is denoted by a variable r. The cellular network calculates the route update radius by setting the route update radius equal to the route update radius at position r from within the set of possible route update radii (R1, R2, R3, ..., Rn). Mathematically, in such an example, the route update radius=Rr. In one example, Rmax, Rmin, p, and (R1, R2, R3, ..., Rn) are as defined with reference to FIG. 2. Similar to the last example, by varying the route update radius for each user equipment, the cellular network is able to define different routing areas for each user equipment. Thus, the cellular network is able to affect the frequency of route update messages from user equipment.

Regardless of how the cellular network calculates the route update radius, the cellular network generates a random number (r) to calculate a route update radius, in this example. Thus, in each of the above examples, a random number (r) was generated in order for the cellular network to calculate the route update radius. As described above, to generate the random number (r), a number of known techniques may be used. By generating different random numbers for different user equipments, the cellular network is able to define different route update radius and hence different routing areas for each user equipment. Thus, the cellular network is able to affect the frequency of route update messages from user equipment and also reduce a burst of route update messages from the user equipments in the same cell of the cellular network and at the same time.

After calculating the route update radius, the cellular network unicasts the route update radius to the user equipment in step 440. As is known, unicasting means sending a message to one particular user equipment, e.g. a message comprising the route update radius. The cellular network also computes a routing area using the calculated route update radius. The cellular network pages the cells in the computed routing area whenever there is an incoming communication at the cellular network for the user equipment. The cellular network pages the cells in the computed routing area for identifying the particular cell where the user equipment currently resides.

In step 450, the user equipment receives the unicasted route update radius. The received route update radius becomes the new route update radius for the user equipment. The user equipment again transmits a route update message to the cellular network, whenever the user equipment leaves the routing area defined by the new route update radius.

With reference to FIG. 3, the operation of updating location of the user equipment may be described. When user equipments 310, 314, 318 are switched ON at the same time and at the same physical location as in the airport example, user equipment 310, 314, 318 send a route update message to the cellular network 305. Upon receiving the route update messages, the cellular network 305 generates a first, second, and third random number. Using the generated first, second, and third random numbers, the cellular network 305 calculates the route update radii 325, 335, 345 for user equipments 310, 314, 318 respectively. In one example, the random numbers generated by the cellular network vary, e.g. are different. As a result, in this example the route update radii 325, 335, 345 are also different.

After calculating the route update radii, the cellular network 305 unicasts the route update radii 325, 335, 345 to user equipments 310, 314, 318 respectively. The cellular network 305 also computes RA1 320, RA2 330, and RA3 340 using the calculated route update radii 325, 335, 345. As a result of different route update radii for different user equipment, the routing areas for different user equipment are also different. When the user equipment 310 leaves RA1 320, the user equipment 310 sends a route update message to the cellular network 305. Similarly, when the user equipment 314 leaves RA2 330, the user equipment 314 sends a route update message to the cellular network 305 and when the user equipment 318 leaves RA3 340, the user equipment 318 sends a route update message to the cellular network 305.

By having different routing areas for each of the user equipment, a burst of route update messages in the cellular network, e.g. at the same time, may be prevented. For example, if each of the user equipment is moving at the same speed, then the user equipment 310 sends a route update message to the cellular network 305 before the user equipment 314 needs to send a route update message to the cellular network 305. The method also prevents a burst of route update messages in the same cells of the cellular network, e.g. as different user equipment leave their respective routing areas at different cells. For example, the user equipment 310 will send a route update message to the cells just outside RA1 320. Similarly, the user equipment 314 will send a route update message to the cells just outside RA2 330.

In this document, relational terms such as first and second, top and bottom, and the like may be used solely to distinguish one entity or action from another entity or action without necessarily requiring or implying any actual such relationship or order between such entities or actions. The above description and the diagrams do not illustrate and do not necessarily require the order illustrated.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for updating location of a user equipment comprising:
   receiving route update radius information by the user equipment;
   calculating a route update radius from the received route update radius information by using a random number generated by the user equipment; and
   transmitting the route update radius by the user equipment to a cellular network.

2. The method of claim 1, wherein the route update radius information comprises at least one of a maximum route update radius (Rmax), a lower unit of scaling (p), and a minimum route update radius (Rmin).

3. The method of claim 2, wherein calculating further comprises:
   selecting the random number such that the random number lies in an interval (p, 1);
   multiplying the selected random number with the maximum route update radius (Rmax) to yield the route update radius.

4. The method of claim 2, wherein calculating further comprises:
   selecting the random number such that the random number lies in an interval (Rmin, Rmax);
   setting the route update radius equal to the selected random number.

5. The method of claim 1 further comprising:
   broadcasting, by the cellular network, the route update radius information;
   receiving, by the cellular network, the route update radius (250); and
   computing, by the cellular network, a routing area using the received route update radius.

6. The method of claim 5, wherein the route update radius is conveyed in a route update message.

7. The method of claim 5 further comprising:
   paging, by the cellular network, a plurality of cells in the computed routing area for identifying a cell where the user equipment currently resides.

8. The method of claim 1, wherein the route update radius information comprises a set of possible route update radii (R1, R2, R3 . . . Rn).

9. The method of claim 5, wherein calculating further comprises:
   selecting the random number such that the random number is an integer that lies in an interval (1, n), wherein the selected random number is denoted by a variable r;
   choosing a possible route update radius found at a position r from within the set of possible route update radii; and
   setting the route update radius equal to the chosen possible route update radius.

10. The method of claim 1 further comprising:
    broadcasting, by the cellular network, the route update radius information;
    receiving, by the cellular network, the route update radius; and
    computing, by the cellular network, a routing area using the received route update radius.

11. The method of claim 10, wherein the route update radius is conveyed in a route update message.

* * * * *